(12) United States Patent
Hoshiba et al.

(10) Patent No.: US 9,761,854 B2
(45) Date of Patent: Sep. 12, 2017

(54) SPIRALLY-WOUND ELECTRODE ASSEMBLY FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Koji Hoshiba, Yokohama (JP); Yasuo Takano, Yokohama (JP)

(73) Assignee: Samsug SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/562,503

(22) Filed: Dec. 5, 2014

(65) Prior Publication Data

US 2015/0171394 A1    Jun. 18, 2015

(30) Foreign Application Priority Data

Dec. 13, 2013 (JP) ................. 2013-257952
Nov. 19, 2014 (KR) ................. 10-2014-0161736

(51) Int. Cl.
| | |
|---|---|
| *H01M 2/16* | (2006.01) |
| *H01M 10/0587* | (2010.01) |
| *H01M 10/052* | (2010.01) |
| *H01M 4/62* | (2006.01) |

(52) U.S. Cl.
CPC ......... *H01M 2/168* (2013.01); *H01M 2/1606* (2013.01); *H01M 2/166* (2013.01); *H01M 2/1653* (2013.01); *H01M 2/1686* (2013.01); *H01M 4/623* (2013.01); *H01M 10/052* (2013.01); *H01M 10/0587* (2013.01); *H01M 2/1666* (2013.01)

(58) Field of Classification Search
CPC ........... H01M 10/0525; H01M 2/1686; H01M 2/1673
See application file for complete search history.

(56) References Cited

U.S. PATENT DOCUMENTS

| 4,400,487 A | 8/1983 | Stoneberg et al. |
| 5,964,903 A | 10/1999 | Gao et al. |

(Continued)

FOREIGN PATENT DOCUMENTS

| CN | 101960659 A | 1/2011 |
| CN | 101997102 A | 3/2011 |

(Continued)

OTHER PUBLICATIONS

U.S. Office action dated Aug. 28, 2015, for cross reference U.S. Appl. No. 13/951,407, (24 pages).

(Continued)

*Primary Examiner* — Stewart Fraser
*Assistant Examiner* — Olatunji Godo
(74) *Attorney, Agent, or Firm* — Lewis Roca Rothgerber Christie LLP

(57) ABSTRACT

A spirally-wound electrode assembly for a rechargeable lithium battery includes a positive electrode, a negative electrode and a separator between the positive electrode and the negative electrode, wherein the separator includes a porous film and an adhesive layer on at least one side of the porous film, and the adhesive layer includes a fluorine-based polymer-containing particulate and a binder. A rechargeable lithium battery includes the spirally-wound electrode assembly.

18 Claims, 2 Drawing Sheets

(56) References Cited

U.S. PATENT DOCUMENTS

| | | | |
|---|---|---|---|
| 5,981,107 A * | 11/1999 | Hamano | H01M 4/04 429/129 |
| 6,632,561 B1 | 10/2003 | Bauer et al. | |
| 6,660,433 B2 | 12/2003 | Watanabe et al. | |
| 6,692,867 B2 | 2/2004 | Nark et al. | |
| 7,311,994 B2 | 12/2007 | Sugiyama et al. | |
| 8,563,176 B2 | 10/2013 | Sano | |
| 2003/0114614 A1 | 6/2003 | Wille et al. | |
| 2005/0238962 A1 | 10/2005 | Noh | |
| 2006/0068296 A1 | 3/2006 | Nakagawa et al. | |
| 2007/0020413 A1 * | 1/2007 | Moriuchi | B65D 41/24 428/34.9 |
| 2009/0181295 A1 | 7/2009 | Usami et al. | |
| 2010/0196688 A1 * | 8/2010 | Kritzer | H01M 2/162 428/220 |
| 2011/0008673 A1 | 1/2011 | Ugaji et al. | |
| 2011/0045338 A1 | 2/2011 | Bae et al. | |
| 2011/0052987 A1 * | 3/2011 | Katayama | H01M 2/1646 429/221 |
| 2014/0030578 A1 * | 1/2014 | Hoshiba | H01M 2/1653 429/144 |
| 2015/0147627 A1 * | 5/2015 | Takano | H01M 2/1686 429/144 |

FOREIGN PATENT DOCUMENTS

| | | |
|---|---|---|
| CN | 102306726 A | 1/2012 |
| CN | 102437303 A | 5/2012 |
| JP | 10-110052 A | 4/1998 |
| JP | 10-189054 | 7/1998 |
| JP | 10-223195 | 8/1998 |
| JP | 2004-111160 | 4/2004 |
| JP | 2004-241135 | 8/2004 |
| JP | 2004-303473 | 10/2004 |
| JP | 2006-331759 | 12/2006 |
| JP | 2010-176936 | 8/2010 |
| JP | 2010-257828 | 11/2010 |
| JP | 4588286 | 11/2010 |
| JP | 2010-538173 A | 12/2010 |
| JP | 2011-204627 A | 10/2011 |
| JP | 2011-228049 | 11/2011 |
| JP | 2012-190784 A | 10/2012 |
| JP | 2013-089323 | 5/2013 |
| JP | 2013-145669 | 7/2013 |
| JP | 2013-193366 A | 9/2013 |
| KR | 10-0362280 B1 | 11/2002 |
| KR | 10-0399785 B1 | 9/2003 |
| KR | 10-2004-0003738 | 1/2004 |
| KR | 10-2004-0103425 | 12/2004 |
| KR | 10-2009-0064756 | 6/2005 |
| KR | 10-2005-0085095 | 8/2005 |
| KR | 10-1032443 B1 | 1/2007 |
| KR | 10-0688402 B1 | 3/2007 |
| KR | 10-0877161 B1 | 1/2009 |
| WO | WO 2009/110726 A2 | 9/2009 |

OTHER PUBLICATIONS

U.S. Office action dated Dec. 22, 2015, for cross reference U.S. Appl. No. 13/951,407, (23 pages).
U.S. Office action dated Mar. 7, 2016, for cross reference U.S. Appl. No. 14/551,552, (10 pages).
U.S. Notice of Allowance dated Mar. 8, 2016, for cross reference U.S. Appl. No. 13/951,407, (8 pages).
Patent Abstracts of Japan, and English machine translation of Japanese Patent 10-223195 dated Aug. 21, 1998, listed above, (9 pages).
Patent Abstracts of Japan, and English machine translation of Japanese Publication 2004-241135 dated Aug. 26, 2004, listed above, (16 pages).
Patent Abstracts of Japan, and English machine translation of Japanese Publication 2004-303473 dated Oct. 28, 2004, listed above, (15 pages).
Patent Abstracts of Japan, and English machine translation of Japanese Publication 2006-331759 dated Dec. 7, 2006, listed above, (21 pages).
Patent Abstracts of Japan, and English machine translation of Japanese Publication 2010-176936 dated Aug. 12, 2010, listed above, (17 pages).
Patent Abstracts of Japan, and English machine translation of Japanese Publication 2003-171495 dated Jun. 20, 2003, corresponding to Japanese Patent 4588286 dated Nov. 24, 2010, listed above, (22 pages).
Patent Abstracts of Japan, and English machine translation of Japanese Publication 2011-228049 dated Nov. 10, 2011, listed above, (24 pages).
Patent Abstracts of Japan, and English machine translation of Japanese Publication 2013-089323 dated May 13, 2013, listed above, (11 pages).
Patent Abstracts of Japan, and English machine translation of Japanese Publication 2013-145669 dated Jul. 25, 2013, listed above, (23 pages).
Ebnesajjad, et al., "Fluoropolymer Additives," First Edition 2012, © Elsevier Inc., ISBN: 978-1-4377-3461-4, (6 sheets).
SIPO Office Action dated Jun. 28, 2016, for corresponding Chinese Patent Application No. 201310316586.8 (pages).
U.S. Office Action dated Aug. 25, 2016, for U.S. Appl. No. 14/551,552 (14 pages).
U.S. Office Action dated Nov. 8, 2016, for cross-reference U.S. Appl. No. 14/551,552 (4 pages).
Machine English Translation of JP 10-110052 A, published Apr. 28, 1998, 11 pages.
Machine English Translation of JP 2011-204627 A, published Oct. 13, 2011, 18 pages.
Machine English Translation of JP 2012-190784 A, published Oct. 4, 2012, 54 pages.
Machine English Translation of JP 2013-193366 A, published Sep. 30, 2013, 17 pages.
Korean Patent Abstract for KR 10-2001-0095623 A, which corresponds to KR Publ. No. 10-0362280 B1, published Nov. 23, 2002, 1 page.
Korean Patent Abstract for KR 10-2007-0009423 A, which corresponds to KR Publ. No. 10-1032443 B1, published Jan. 18, 2007, 1 page.
U.S. Office Action dated Apr. 12, 2017, issued in cross-reference U.S. Appl. No. 14/551,552 (16 pages).

* cited by examiner

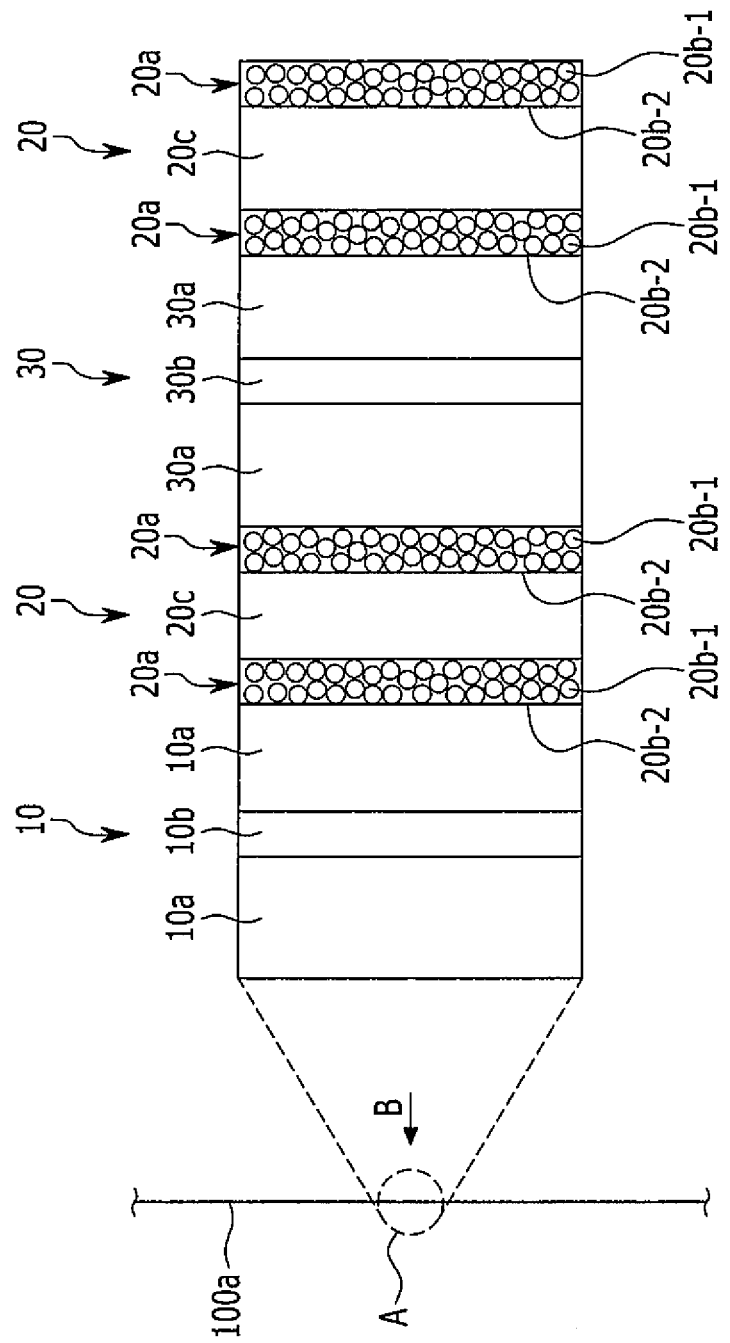

SPIRALLY-WOUND ELECTRODE ASSEMBLY FOR RECHARGEABLE LITHIUM BATTERY AND RECHARGEABLE LITHIUM BATTERY INCLUDING SAME

CROSS-REFERENCE TO RELATED APPLICATIONS

This application claims priority to and the benefit of Japanese Patent Application No. 2013-257952 filed on Dec. 13, 2013, and Korean Patent Application No. 10-2014-0161736 filed in the Korean Intellectual Property Office on Nov. 19, 2014, the entire contents of both of which are incorporated herein by reference.

BACKGROUND

1. Field

A spirally-wound electrode assembly for a rechargeable lithium battery and a rechargeable lithium battery including the same are disclosed.

2. Description of the Related Art

A fluorine-based polymer such as polyvinylidene fluoride (PVDF) is widely used as a matrix polymer of a gel electrolyte for a rechargeable lithium battery. For example, a porous layer including the fluorine-based polymer on the surface of a separator has been formed, for example, by the following method.

A first method is to prepare a slurry by dissolving the fluorine-based polymer in an organic solvent such as N-methylpyrrolidone, dimethyl acetamide, acetone and/or the like. Subsequently, the slurry is coated on a separator or an electrode, and the fluorine-based polymer is phase-separated by using a poor solvent such as water, methanol, tripropylene glycol and/or the like to perforate the fluorine-based polymer and to form a coating layer on the separator or the electrode. A second method is to prepare heated slurry by dissolving the fluorine-based polymer in a heated electrolyte solution using a solvent such as dimethyl carbonate, propylene carbonate, ethylene carbonate and/or the like. Subsequently, the heated slurry is coated on a separator or an electrode to form a coating layer. Then, the coating layer is cooled down to gelate (gel) the fluorine-based polymer and to form a porous layer swollen by the electrolyte solution.

However, the separator having the porous layer on the surface in these methods shows an undesirable or insufficient slip and easily generates static electricity, and thus, is difficult to handle in a manufacturing process as compared with a separator having no porous layer. For example, when the separator is overlapped with band-shaped positive and negative electrodes to manufacture a spirally-wound electrode assembly, the separator has an undesirable or insufficient slip with the positive and negative electrodes, and thus, the spirally-wound electrode assembly may be distorted. When the spirally-wound electrode assembly is distorted, it may be difficult to house such spirally-wound electrode assembly in a case. Further, such distorted spirally-wound electrode assembly may result in an undesirable or insufficient cycle-life of a battery.

SUMMARY

According to one embodiment of the present invention, a spirally-wound electrode assembly for a rechargeable lithium battery using a separator having a little slip and being easily handled, is provided. Such spirally-wound electrode assembly is configured to be resistant to distortion, such that distortion is suppressed, prevented, or reduced. In addition, cycle-life characteristics of a battery is also improved.

According to another embodiment of the present invention, a rechargeable lithium battery including the spirally-wound electrode assembly is provided.

According to one embodiment of the present invention, a spirally-wound electrode assembly for a rechargeable lithium battery includes a positive electrode; a negative electrode; and a separator between the positive electrode and the negative electrode; wherein the separator includes a porous film and an adhesive layer on at least one side of the porous film, and the adhesive layer includes a fluorine-based polymer-containing particulate and a binder.

The binder may be included in a smaller amount than that of the fluorine-based polymer-containing particulate.

The volume ratio of the fluorine-based polymer-containing particulate and the binder may be about 1.5:1 to about 20:1.

The fluorine-based polymer-containing particulate may include spherically shaped particles.

The fluorine-based polymer-containing particulate may include a particulate combined with the fluorine-based polymer and a resin different from the fluorine-based polymer, and the resin different from the fluorine-based polymer may include an acrylic resin.

The fluorine-based polymer of the fluorine-based polymer-containing particulate may include polyvinylidene fluoride.

The binder may include a polyolefin resin.

The adhesive layer may further include inorganic particles.

The negative electrode may include a negative active material layer including a negative active material and a binder, the binder may include a fluorine-based polymer-containing particulate, and the adhesive layer of the separator may bind with the negative active material layer.

The binder may further include an elastomer-based polymer particulate.

Another embodiment provides a rechargeable lithium battery including the spirally-wound electrode assembly.

Other embodiments are included in the following detailed description.

Accordingly, a distortion of a spirally-wound electrode assembly may be suppressed, reduced, or prevented, and at the same time, cycle-life characteristics of a battery may be improved by using a separator having a little slip.

BRIEF DESCRIPTION OF THE DRAWINGS

The accompanying drawings, together with the specification, illustrate embodiments of the present invention, and, together with the description, serve to explain the principles of the present invention.

FIG. 2 is a cross-sectional view showing a schematic structure of an electrode stack structure for a rechargeable lithium battery.

DETAILED DESCRIPTION

Figure 1:
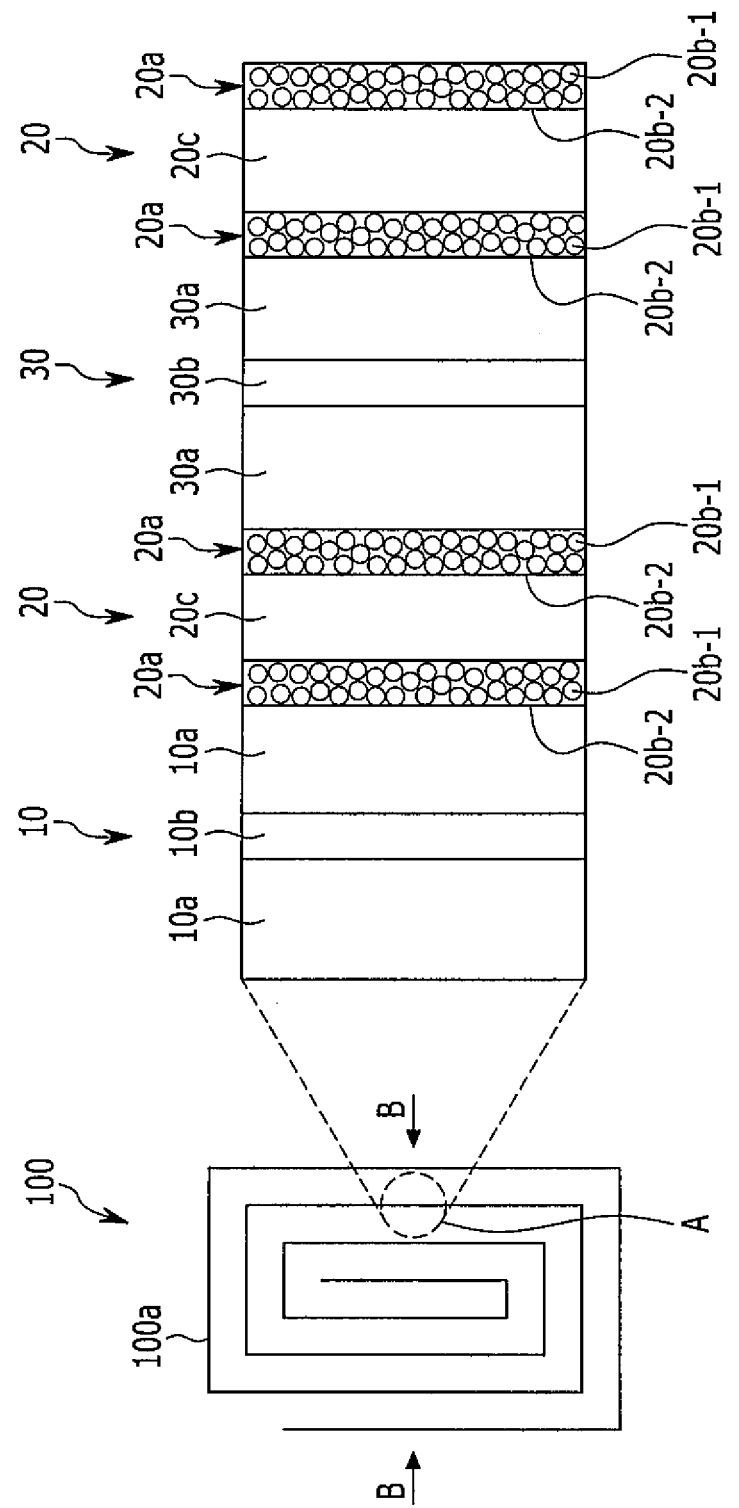
FIG. 1 is a cross-sectional view showing a schematic structure of a spirally-wound electrode assembly for a rechargeable lithium battery according to one embodiment of the present invention.

Exemplary embodiments will hereinafter be described in more detail. However, these embodiments are exemplary, and this disclosure is not limited thereto. When a first element is described as being "connected" or "coupled" to a second element, the first element may be "directly connected" or "directly coupled" to the second element, or "indirectly connected" or "Indirectly coupled" to the second element with one or more other elements interposed therebetween.

Hereinafter, a rechargeable lithium battery according to one embodiment is described with reference to FIGS. 1 and 2.

FIG. 1 is a cross-sectional view showing a schematic structure of a spirally-wound electrode assembly for a rechargeable lithium battery according to one embodiment, and FIG. 2 is a cross-sectional view showing a schematic structure of an electrode stack structure for a rechargeable lithium battery.

Referring to FIGS. 1 and 2, the rechargeable lithium battery includes a spirally-wound electrode assembly 100, a non-aqueous electrolyte, and an external material. The spirally-wound electrode assembly 100 is formed by winding an electrode stack structure 100a sequentially stacked with a negative electrode 10, a separator 20, a positive electrode 30 and a separator 20 in a length direction and then compressing the same in a B direction. The negative electrode 10, the separator 20 and the positive electrode 30 may each be band-shaped.

Hereinafter, the separator 20 is described.

The separator 20 may include a porous film 20c and an adhesive layer 20a on at least one side of the porous film 20c, for example, on both sides thereof.

The porous film 20c has no particular limitation but may include, for example, a porous layer, a non-woven fabric or the like having excellent high rate discharge performance, which may be used alone or as a combination thereof.

In addition, a resin of the porous film 20c may be, for example, a polyolefin-based resin, a polyester-based resin, polyvinylidene fluoride (PVDF), a vinylidenefluoride-hexafluoropropylene copolymer, a vinylidenefluoride-perfluorovinylether copolymer, a vinylidenefluoride-tetrafluoroethylene copolymer, a vinylidenefluoride-trifluoroethylene copolymer, a vinylidenefluoride-fluoroethylene copolymer, a vinylidenefluoride-hexafluoroacetone copolymer, a vinylidenefluoride-ethylene copolymer, a vinylidenefluoride-propylene copolymer, a vinylidenefluoride-trifluoropropylene copolymer, a vinylidenefluoride-tetrafluoroethylene-hexafluoropropylene copolymer, a vinylidenefluoride-ethylene-tetrafluoroethylene copolymer, and/or the like. Examples of the polyolefin-based resin may include polyethylene, polypropylene, and the like, and examples of the polyester-based resin may include polyethylene terephthalate, polybutylene terephthalate, and the like.

The adhesive layer 20a may include a fluorine-based polymer-containing particulate 20b-1 and a binder 20b-2, and binds the separator 20 with the negative electrode 10, or binds the separator 20 with the positive electrode 30.

The fluorine-based polymer-containing particulate 20b-1 may be a particulate including a fluorine-based polymer, and may be, for example, a particulate combined with the fluorine-based polymer and a resin different from the fluorine-based polymer.

The resin different from the fluorine-based polymer may include an acrylic resin, but the resin is not limited thereto. In other words, examples of the fluorine-based polymer-containing particulate may include a particulate in which the fluorine-based polymer is combined with an acrylic resin, but the present invention is not limited thereto. The combination may have an IPN (inter-penetrating network polymer) structure (e.g., the fluorine-based polymer and the resin different from the fluorine-based polymer may form an inter-penetrating polymer network).

The fluorine-based polymer of the fluorine-based polymer-containing particulate 20b-1 may be polyvinylidene fluoride (PVDF), a copolymer including polyvinylidene fluoride (PVDF), but the fluorine-based polymer is not limited thereto. The copolymer including PVDF may be a vinylidenefluoride (VDF)-hexafluoropropylene (HFP) copolymer, a vinylidenefluoride (VDF)-tetrafluoroethylene (TFE) copolymer, a vinylidenefluoride (VDF)-tetrafluoroethylene (TFE)-hexafluoropropylene (HFP) copolymer, which may be used singularly or in a mixture of two or more.

The particle diameter (when the particulate is assumed to have a spherical shape) of the fluorine-based polymer-containing particulate 20b-1 has no particular limitation, as long as the particulate is dispersed into the negative active material layer 10a. For example, the average particle diameter (an arithmetic average particle diameter) of the fluorine-based polymer-containing particulate may be about 80 nm to about 500 nm. The average particle diameter of the fluorine-based polymer-containing particulate may be measured, for example, using a laser diffractometry method. For example, the particle distribution of the fluorine-based polymer-containing particulate is obtained using the laser diffractometry method, and its average particle diameter may be calculated based on the particle distribution.

The fluorine-based polymer-containing particulate 20b-1 may be prepared by, for example, emulsion-polymerizing a monomer deriving a fluorine-based polymer or suspension-polymerizing a monomer deriving a fluorine-based polymer and then, grinding a coarse particle obtained therefrom. The fluorine-based polymer-deriving monomer may include, for example, vinylidenefluoride (VDF) and the like, but the monomer is not limited thereto.

The fluorine-based polymer-containing particulate 20b-1 may be spherically shaped particles. The spherically shaped fluorine-based polymer-containing particulate may be formed, for example, by the emulsion polymerization method. In addition, the shape and structure of the fluorine-based polymer-containing particulate may be examined by using, for example, a scanning electron microscope (SEM).

A binder 20b-2 may support the fluorine-based polymer-containing particulate 20b-1 in the adhesive layer 20a.

The content of the binder 20b-2 in the adhesive layer 20a may be smaller than the content of the fluorine-based polymer-containing particulate 20b-1 in terms of their volumes. For example, the volume ratio of the fluorine-based polymer-containing particulate and the binder may be about 1.5:1 to 20:1, or about 2:1 to 20:1.

The binder 20b-2 may include a polyolefin resin. The polyolefin resin may be, for example, polyethylene, polypropylene, an ethylene-vinyl acetate copolymer, ethylene-acrylic copolymer, an ionomer thereof, and/or the like, but the polyolefin resin is not limited thereto.

The binder 20b-2 may further include an elastomer-based polymer particulate.

Examples of the elastomer-based polymer may include a styrene-butadiene rubber, a butadiene rubber, a nitrile butadiene rubber, a natural rubber, an isoprene rubber, an ethylene-propylene-diene terpolymer, a chloroprene rubber, a chlorosulfonated polyethylene, an acrylate ester, a copolymer of a metacrylate ester, a partly or wholly hydrogenated polymer thereof, an acrylate ester-based copolymer, and the like, but the elastomer-based polymer is not limited thereto. In addition, in order to improve the binding properties, the binder (e.g., the elastomer-based polymer) may be modified with a monomer having a polar functional group such as a carboxylic acid group, a sulfonic acid group, a phosphoric acid group, a hydroxy group, and/or the like.

The adhesive layer 20a may further include a thickener in order to provide a viscosity for suitable coating.

The thickener may be a water-soluble polymer, for example, a cellulose-based polymer, a polyacrylic acid-based polymer, a polyvinyl alcohol, polyethyleneoxide, and/or the like, but the thickener is not limited thereto. The cellulose-based polymer may include, for example, a metal salt or an ammonium salt of carboxylmethyl cellulose (CMC), a cellulose derivative of methyl cellulose, ethyl cellulose, hydroxyalkyl cellulose and/or the like. Other examples may include one or more of polyvinylpyrrolidone (PVP), starch, phosphoric acid starch, casein, each kind of modified starch, chitin, a chitosan derivative, and the like. These thickeners may be used singularly or in a mixture of two or more. Among them, the cellulose-based polymer may be used, and for example, an alkali metal salt of carboxylmethyl cellulose may be used.

The content ratio of the thickener and the binder is not particularly limited and may be any suitable ratio used in the art.

In addition, the adhesive layer 20a may further include inorganic particles to adjust porosity or to secure thermal stability. The inorganic particles may be ceramic particles, and may be, for example, metal oxide particles, but the inorganic particles are not limited thereto. The metal oxide particles may be, for example, a particulate such as alumina, boehmite, titania, zirconia, magnesia, zinc oxide, aluminum hydroxide, magnesium hydroxide, and/or the like. The inorganic particles may have an average particle diameter of less than or equal to about ½ of the thickness of the adhesive layer. The average particle diameter of the inorganic particles indicates D50 as a cumulative volume 50%, for example, measured using a laser diffraction method and/or the like. The content of the inorganic particles is not particularly limited but may be, for example, less than or equal to about 70 wt % of the total amount of the adhesive layer 20a.

The separator 20 may be manufactured using the following method. The adhesive layer 20a may be formed by dispersing and dissolving a material for the adhesive layer 20a in water to prepare an adhesive layer active mass slurry, that is, an aqueous slurry, coating the active mass slurry on at least one surface of a porous film 20c to form a coating layer and subsequently, drying the coating layer.

Hereinafter, the negative electrode 10 according to an example embodiment of the present invention will be described.

The negative electrode 10 includes a negative current collector 10b and a negative active material layer 10a formed on the negative current collector 10b. The negative electrode 10 may be an aqueous negative electrode.

The negative active material layer 10a may include a negative active material and a binder, and may further include a thickener.

The negative active material is not particularly limited as long as it is a lithium-containing alloy, or a material being capable of reversibly intercalating and deintercalating lithium, and may be, for example, a metal such as lithium (Li), indium (In), tin (Sn), aluminum (Al), silicon (Si) and/or the like, an alloy thereof and an oxide thereof, a transition metal oxide such as $Li_{4/3}Ti_{5/3}O_4$, SnO and/or the like, a carbon material such as artificial graphite, natural graphite, a mixture of artificial graphite and natural graphite, natural graphite coated with artificial graphite, non-graphitizable carbon, a graphite carbon fiber, a resin-fired carbon, a thermally decomposed vapor grown carbon, coke, mesocarbon microbeads (MCMB), a furfuryl alcohol resin fired carbon, polyacene, a pitch-based carbon fiber, and/or the like. These negative active materials may be used singularly or in a mixture of two or more. Among them, the graphite-based material may be used as a main material.

The binder binds the negative active materials. The binder may include a fluorine-based polymer-containing particulate.

The fluorine-based polymer-containing particulate is dispersed in water and may form latex. Accordingly, the water may be used as a solvent of a slurry for forming the negative active material layer 10a.

The fluorine-based polymer-containing particulate is the same or substantially the same as the fluorine-based polymer-containing particulate 20b-1 included in the above-described adhesive layer of the separator.

The binder may further include an elastomer-based polymer particulate. The elastomer-based polymer particulate is the same or substantially the same as an elastomer-based polymer particulate included in the above-described adhesive layer of the separator.

The thickener may play a role of adjusting viscosity appropriate for coating the negative electrode active mass slurry and at the same time, work as a binder in the negative active material layer 10a. The thickener is the same or substantially the same as a thickener included in the above-described adhesive layer of the separator, and thus, will not be illustrated in further detail here.

The content ratio of the thickener and the binder is not particularly limited, but may be any suitable ratio applicable to a negative active material layer of a rechargeable lithium battery used in the art.

The negative current collector 10b may include any suitable materials as long as they are electrically conductive, and examples thereof may include aluminum, copper, stainless steel, nickel-plated steel and/or the like. The negative current collector 10b may be connected with a negative terminal.

The negative electrode 10 may be manufactured in the following method. The above materials for a negative active material layer are dispersed into water to prepare a negative electrode active mass slurry, that is, an aqueous slurry, and then, the negative electrode active mass slurry is coated on a current collector and dried. For example, the fluorine-based polymer-containing particulate and the elastomer-based polymer particulate included in the negative electrode active mass slurry are dispersed in the negative active material layer 10a. Subsequently, the dried coating layer is compressed with the negative current collector 10b, thereby manufacturing the negative electrode 10.

Hereinafter, the positive electrode 30 according to example embodiments of the present invention will be described.

The positive electrode 30 includes a positive current collector 30b and a positive active material layer 30a disposed on the positive current collector 30b.

The positive active material layer 30a includes at least a positive active material, and may further include a conductive agent and a binder.

The positive active material is not particularly limited as long as the material may reversibly intercalate and deintercalate lithium ions, and may be for example, lithium cobalt oxide, lithium nickel oxide, lithium nickel cobalt oxide, lithium nickel cobalt aluminum oxide, lithium nickel cobalt manganese oxide, lithium manganese oxide, lithium iron phosphate, nickel sulfide, copper sulfide, sulfur, iron oxide, vanadium oxide, and/or the like. These positive active materials may be used singularly or as a mixture of two or more. For example, the lithium metal oxide having a layered rock salt structure may be used.

The lithium metal oxide having the layered rock salt structure may be, for example, a ternary element lithium metal oxide represented by $Li_{1-x-y-z}Ni_xCo_yAl_zO_2$ or $Li_{1-x-y-z}Ni_xCo_yMn_zO_2$ (0<x<1, 0<y<1 and 0<z<1, and x+y+z<1).

The conductive agent may be, for example, carbon black such as Ketjen black, acetylene black, and/or the like, natural graphite, artificial graphite, and/or the like, but the conductive agent is not limited thereto. For example, the conductive agent may be any suitable one used in the art in order to improve conductivity of a positive electrode without limitation.

The binder may bind the positive active materials and, at the same time, may bind the positive active material with the positive current collector 30b. The binder is not particularly limited, and may be any suitable binder used in a positive active material layer in the art of a rechargeable lithium battery. The binder may include, for example, polyvinylidene fluoride, a vinylidenefluoride-hexafluoropropylene copolymer, a vinylidenefluoride-perfluorovinylether copolymer, a vinylidenefluoride-tetrafluoroethylene copolymer, a vinylidenefluoride-trifluoroethylene copolymer, an ethylene-propylene-diene terpolymer, a styrene-butadiene rubber, an acrylonitrile-butadiene rubber, a fluorine rubber, polyvinylacetate, polymethylmethacrylate, polyethylene, cellulose nitrate, and/or the like.

The positive current collector 30b may include any suitable conductor, for example, aluminum, stainless steel, nickel-plated steel and/or the like. The positive current collector 30b may be connected with a positive terminal.

The positive electrode 30 may be manufactured as follows. The materials for a positive active material layer are dispersed in an organic solvent or water to prepare a positive electrode active mass slurry, and then, the positive electrode active mass slurry is coated on a current collector and dried. Subsequently, the dried coating layer is compressed with a positive current collector 30b, manufacturing a positive electrode 30.

Hereinafter, the non-aqueous electrolyte according to example embodiments of the present invention will be described.

The non-aqueous electrolyte may include any suitable non-aqueous electrolyte usable for a rechargeable lithium battery without particular limitation. For example, the non-aqueous electrolyte has a composition that an electrolytic salt is contained in a non-aqueous solvent.

The electrolytic salt may be, for example, an inorganic ion salt including lithium (Li), sodium (Na) or potassium (K) such as $LiClO_4$, $LiBF_4$, $LiAsF_6$, $LiPF_6$, $LiPF_{6-x}(CnF_{2n+1})_x$ (1<x<6, n=1 or 2), LiSCN, LiBr, LiI, $Li_2SO_4$, $Li_2B_{10}Cl_{10}$, $NaClO_4$, NaI, NaSCN, NaBr, $KClO_4$, KSCN and/or the like; an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, stearyl sulfate, lithium octyl sulfate, lithium dodecylbenzene sulphonate, and/or the like, which may be used singularly or as a mixture of two or more.

A concentration of the electrolytic salt is not particularly limited, and may be, for example, about 0.8 mol/L to about 1.5 mol/L.

The non-aqueous solvent may be, for example, cyclic carbonate esters such as propylene carbonate, ethylene carbonate, butylene carbonate, chloroethylene carbonate, vinylene carbonate, and the like; linear carbonates such as dimethyl carbonate, diethyl carbonate, ethylmethyl carbonate, and/or the like; cyclic esters such as γ-butyrolactone, γ-valerolactone, and the like; linear esters such as methyl formate, methyl acetate, butyric acid methyl, and/or the like; tetrahydrofuran or a derivative thereof; ethers such as 1,3-dioxane, 1,4-dioxane, 1,2-dimethoxy ethane, 1,4-dibutoxyethane, methyl diglyme and the like; nitriles such as acetonitrile, benzonitrile, and the like; dioxolane or a derivative thereof; ethylene sulfide, sulfolane, sultone or a derivative thereof, which may be used singularly or as a mixture of two or more, without limitation.

The non-aqueous electrolyte is impregnated into the separator 20.

Each above electrode may appropriately include any suitable auxiliary conductive agent, an additive and/or the like that are available in the art.

The external material may include, for example, aluminum laminate.

Hereinafter, a method of manufacturing a rechargeable lithium battery will be described.

The electrode stack structure 100a may be formed by sequentially stacking a negative electrode 10, a separator 20, a positive electrode 30 and a separator 20. Accordingly, since the separator 20 is disposed on one side (e.g., a front side) of the electrode stack structure 100a, while the negative electrode 10 is disposed on the other side (e.g., a rear side) thereof, the surface of the one side of the electrode stack structure 100a, that is, the separator 20, contacts with the other side of the electrode stack structure 100a, that is, the negative electrode 10, when the electrode stack structure 100a is wound. In this way, a spirally-wound electrode assembly 100 is manufactured. Subsequently, the spirally-wound electrode assembly 100 is compressed into a flat shape, the flat spirally-wound electrode assembly 100 along with a non-aqueous electrolyte is inserted into an exterior housing, for example, a laminate film, and the exterior housing is sealed, manufacturing a rechargeable lithium battery. When the exterior housing is sealed, terminals connected to respective current collectors are externally protruded.

Hereinafter, the embodiments of the present disclosure are illustrated in more detail with reference to examples. Furthermore, some features and aspects that are within the spirit and scope of the present invention but may not be specifically described in this disclosure may be sufficiently understood by those who have knowledge in this field and/or skilled in the art.

Example 1

Manufacture of Positive Electrode $LiCoO_2$, carbon black and polyvinylidene fluoride in a solid weight ratio of 96:2:2 were dissolved and dispersed into N-methylpyrrolidone, preparing a positive electrode active mass slurry. Subsequently, the positive electrode active mass slurry was coated on both sides of a 12 μm-thick aluminum foil current collector. The coated layer was dried and then, compressed to form a positive active material layer. The current collector and positive active material layer had a total thickness of 120 μm. Subsequently, an aluminum lead wire was welded at the end of an electrode, thereby manufacturing a positive electrode.

(Manufacture of Negative Electrode)

A negative electrode active mass slurry was prepared by dissolving and dispersing graphite, a carboxy-modified styrene-butadiene rubber particulate aqueous dispersion as a binder, a fluorine-based polymer-containing particulate aqueous dispersion (Aquatec ARC made by Arkema) combined by polymerizing an acrylic resin in a polyvinylidene fluoride (PVDF) aqueous dispersion as a binder, and a sodium salt of carboxylmethyl cellulose as a thickener in a solid ratio of 97:1:1:1 in water. Herein, the fluorine-based polymer-containing particulate had an average particle diameter of 300 nm when measured using a laser diffraction method and also, a spherical particle when examined with a scanning electron microscope (SEM). Subsequently, the negative electrode active mass slurry was coated on both sides of a 10 μm-thick copper foil current collector and dried. After the drying, the coating layer was compressed, forming a negative active material layer. Herein, the current collector and the negative active material layer had a total thickness of 120 μm. Then, a nickel lead wire was welded at the end thereof, thereby manufacturing a negative electrode.

(Manufacture of Separator)

An adhesive layer active mass slurry was prepared by dissolving and dispersing a fluorine-based polymer-containing particulate aqueous dispersion (Aquatec ARC made by Arkema) combined by polymerizing an acrylic resin in a polyvinylidene fluoride (PVDF) aqueous dispersion, a sodium salt of carboxylmethyl cellulose as a thickener and a polyethylene ionomer particulate aqueous dispersion (SX-130H made by Soken Chemical & Engineering Co., Ltd.) as a binder in a solid weight ratio 95:1:4 in water. Subsequently, the adhesive layer active mass slurry was coated on both sides of a 12 μm-thick porous polyethylene film and dried, manufacturing a separator having a 3 μm-thick adhesive layer on both sides. Herein, the fluorine-based polymer-containing particulate aqueous dispersion and the polyethylene ionomer particulate aqueous dispersion had a volume ratio of 18:1.

(Manufacture of Spirally-Wound Electrode Assembly)

The negative electrode, the separator and the positive electrode were sequentially stacked and wound in a length direction by using a wick having a diameter of 3 cm. After fixing the end on a tape and removing the wick, the cylindrical spirally-wound electrode assembly was placed between two sheets of 3 cm-thick metal plates and maintained for 3 seconds, thereby manufacturing a flat-type (or flat-kind) spirally-wound electrode assembly.

(Manufacture of Rechargeable Lithium Battery Cell)

The spirally-wound electrode assembly was sealed with an electrolyte solution under a reduced pressure while the two lead wires were taken out of a three polypropylene/aluminum/nylon-layered laminate film, thereby manufacturing a rechargeable lithium battery cell. The electrolyte solution was prepared by mixing ethylene carbonate and ethylmethyl carbonate in a volume ratio of 3:7 and dissolving 1M $LiPF_6$ in the mixed solvent. The rechargeable lithium battery cell was placed between two 3 cm-thick metal plates, heated at 80° C. and maintained for 5 minutes.

Example 2

A rechargeable lithium battery cell was manufactured according to the same method as Example 1 except for respectively preparing a negative electrode active mass slurry for a negative electrode and an adhesive layer active mass slurry for a separator as follows.

The negative electrode active mass slurry was prepared by dissolving and dispersing graphite, a modified styrene-butadiene rubber particulate aqueous dispersion and a sodium salt of carboxylmethyl cellulose as a thickener in a solid weight ratio of 97:2:1 in water.

The adhesive layer active mass slurry was prepared by dissolving and dispersing a fluorine-based polymer-containing particulate aqueous dispersion (Aquatec ARC made by Arkema) combined by polymerizing an acrylic resin in a PVDF aqueous dispersion, a sodium salt of carboxylmethyl cellulose as a thickener, and a polyethylene ionomer particulate aqueous dispersion (SX-130H made by Soken Chemical & Engineering Co., Ltd.) as a binder in a solid weight ratio of 89:1:10 in water. Herein, the fluorine-based polymer-containing particulate aqueous dispersion and the polyethylene ionomer particulate aqueous dispersion had a volume ratio of 7:1.

Example 3

A rechargeable lithium battery cell was manufactured according to the same method as Example 1 except for respectively preparing a negative electrode active mass slurry for a negative electrode and an adhesive layer active mass slurry for a separator as follows.

The adhesive layer active mass slurry was prepared by dissolving and dispersing alumina powder having an average particle diameter of 0.5 μm as inorganic particles, a fluorine-based polymer-containing particulate aqueous dispersion (Aquatec ARC made by Arkema) combined by polymerizing an acrylic resin in a PVDF aqueous dispersion, a sodium salt of carboxylmethyl cellulose as a thickener and a polyethylene ionomer particulate aqueous dispersion (SX-130H made by Soken Chemical & Engineering Co., Ltd.) as a binder in a solid weight ratio of 62:27:1:10 in water. Herein, the fluorine-based polymer-containing particulate aqueous dispersion and the polyethylene ionomer particulate aqueous dispersion had a volume ratio of 2:1. In addition, the alumina powder had an average particle diameter of a cumulative volume 50% (D50) measured using a laser diffraction method.

Comparative Example 1

A rechargeable lithium battery cell was manufactured according to the method as Example 1 except for manufacturing a separator as follows.

A porous networked adhesive layer was formed by coating a solution obtained by dissolving polyvinylidene fluoride (PVDF) in N-methylpyrrolidone on both sides of a 12 μm-thick porous polyethylene film, dipping the coated film in water, and drying it. Herein, the adhesive layer was 3 μm thick.

Comparative Example 2

A rechargeable lithium battery cell was manufactured according to the same method as Example 2 except for using a cross-linking polystyrene particulate instead of the fluorine-based polymer-containing particulate aqueous dispersion combined by polymerizing an acrylic resin in a PVDF aqueous dispersion during the manufacture of a separator.

Evaluation 1: Thickness Increase Rate of Spirally-Wound Electrode Assembly

Each spirally-wound electrode assembly according to Examples 1 to 3 and Comparative Examples 1 and 2 was allowed to stand for 48 hours, and its thickness increase rate was measured to evaluate shape stability. The results are provided in the following Table 1.

The smaller the thickness increase rate was, the less the spirally-wound electrode assembly was distorted, showing satisfactory shape stability. The thickness increase rate was calculated by dividing the increased thickness of the electrode assembly before and after being allowed to stand for 48 hours by the thickness of the electrode assembly before being allowed to stand.

Evaluation 2: Cycle-Life Characteristics

The rechargeable lithium battery cells according to Examples 1 to 3 and Comparative Examples 1 and 2 were respectively constant current-charged at 1/10 CA of design capacity (1 CA is a discharge rate for 1 hour) up to 4.4 V and constant voltage-charged at 4.4 V up to 1/20 CA. Then, the rechargeable lithium battery cells were constant current-charged at 1/2 CA down to 3.0 V. Their capacity at this time was defined as initial discharge capacity to evaluate their cycle-life.

The battery cells were constant current-charged at 0.5 CA and 4.4 V and constant voltage-charged down to 0.05 CA as a charge process and then, constant current-discharged at 0.5 CA and 3.0 V as a discharge process, and then, when the charge and discharge processes was regarded as one cycle, a discharge capacity decrease rate after 100 cycles relative to the initial discharge capacity was calculated, and the results are provided in the following Table 1.

The capacity retention (%) in the following Table 1 was obtained by dividing the discharge capacity after 100 cycles by the initial discharge capacity.

another on the contact sides when the spirally-wound electrode assembly was manufactured to be flat, and thus, the spirally-wound electrode assembly was not distorted, and resultantly, a distance between the electrodes in the battery cell was not stable, thereby deteriorating cycle-life characteristics.

Comparative Example 2 using the cross-linking polystyrene particulate instead of the fluorine-based polymer-containing particulate also showed deteriorated cycle-life characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

What is claimed is:

1. A spirally-wound electrode assembly for a rechargeable lithium battery, the spirally-wound electrode assembly comprising
a positive electrode;
a negative electrode; and
a separator between the positive electrode and the negative electrode,
wherein the separator comprises a porous film and an adhesive layer on at least one side of the porous film, and
the adhesive layer comprises a fluorine-based polymer-containing particulate and a binder, the fluorine-based polymer-containing particulate having an average particle diameter of 80 nm to 500 nm, and the fluorine-based polymer-containing particulate comprising the fluorine-based polymer and a resin different from the fluorine-based polymer.

2. The spirally-wound electrode assembly of claim 1, wherein the binder is included in a smaller amount than that of the fluorine-based polymer-containing particulate.

3. The spirally-wound electrode assembly of claim 1, wherein the volume ratio of the fluorine-based polymer-containing particulate to the binder is about 1.5:1 to about 20:1.

4. The spirally-wound electrode of claim 1, wherein the fluorine-based polymer-containing particulate comprises spherically shaped particles.

TABLE 1

|  | Separator | | | Negative | | |
| --- | --- | --- | --- | --- | --- | --- |
|  | Adhesive layer | Inorganic particle in adhesive layer | Volume ratio of fluorine-based polymer-containing particulate/a binder | electrode Fluorine-based polymer-containing particulate | Thickness increase ratio (%) | Capacity retention (%) |
| Example 1 | fluorine-based polymer-containing particulate | Not containing | 18 | Containing | 5 | 91 |
| Example 2 | fluorine-based polymer-containing particulate | Not containing | 7 | Not containing | 7 | 90 |
| Example 3 | fluorine-based polymer-containing particulate | Containing | 2 | Containing | 6 | 92 |
| Comparative Example 1 | Network-type fluorine-based polymer | Not containing | 18 | Containing | 10 | 85 |
| Comparative Example 2 | cross-linking polystyrene particulate | Not containing | 0 | Not containing | 6 | 85 |

Referring to Table 1, Examples 1 to 3 using the fluorine-based polymer-containing particulate to form an adhesive layer for a separator showed a small thickness increase rate and excellent cycle-life characteristics. In addition, Example 3 further including an inorganic particle to form an adhesive layer for a separator showed much improved cycle-life characteristics.

Comparative Example 1 used a fluorine-based polymer having a network structure rather than a particle shape and showed deteriorated shape stability after manufacturing a flat-type (or flat-kind) spirally-wound electrode assembly. In other words, the spirally-wound electrode assembly of Comparative Example 1 was largely distorted. In addition, since the separator of Comparative Example 1 showed an insufficient slip, the electrode stack structures did not slide one 5. The spirally-wound electrode assembly of claim 1, wherein the resin different from the fluorine-based polymer comprises an acrylic resin.

6. The spirally-wound electrode assembly of claim 1, wherein the fluorine-based polymer of the fluorine-based polymer-containing particulate comprises polyvinylidene fluoride.

7. The spirally-wound electrode assembly of claim 1, wherein the binder comprises a polyolefin resin.

8. The spirally-wound electrode assembly of claim 1, wherein the adhesive layer further comprises inorganic particles.

9. The spirally-wound electrode assembly of claim 1, wherein the negative electrode comprises a negative active material layer comprising a negative active material and a binder,
the binder comprises fluorine-based polymer-containing particulate, and
the adhesive layer of the separator binds with the negative active material layer.

10. The spirally-wound electrode assembly of claim 9, wherein the resin different from the fluorine-based polymer comprises an acrylic resin.

11. The spirally-wound electrode assembly of claim 9, wherein the fluorine-based polymer of the fluorine-based polymer-containing particulate comprises polyvinylidene fluoride.

12. The spirally-wound electrode assembly of claim 9, wherein the binder further comprises an elastomer-based polymer particulate.

13. A rechargeable lithium battery comprising the spirally-wound electrode assembly of claim 1.

14. A spirally-wound electrode assembly for a rechargeable lithium battery, the spirally-wound electrode assembly comprising
a positive electrode;
a negative electrode; and
a separator between the positive electrode and the negative electrode,
wherein the separator comprises a porous film and an adhesive layer on at least one side of the porous film,
wherein the adhesive layer comprises a fluorine-based polymer-containing particulate and a binder,
wherein the fluorine-based polymer-containing particulate has an average particle diameter of 80 nm to 500 nm, and
wherein the fluorine-based polymer-containing particulate comprises an interpenetrating polymer network formed from a fluorine-based polymer and a resin different from the fluorine-based polymer.

15. The spirally-wound electrode assembly of claim 14, wherein the resin different from the fluorine-based polymer comprises an acrylic resin.

16. The spirally-wound electrode assembly of claim 14, wherein the negative electrode comprises a negative active material layer comprising a negative active material and a binder, the binder comprises fluorine-based polymer-containing particulate, and the adhesive layer of the separator binds with the negative active material layer.

17. The spirally-wound electrode assembly of claim 16, wherein the resin different from the fluorine-based polymer comprises an acrylic resin.

18. The spirally-wound electrode assembly of claim 1, wherein the fluorine-based polymer-containing particulate has an average particle diameter of 300 nm to 500 nm.

* * * * *